(12) United States Patent
Medwed et al.

(10) Patent No.: US 10,678,474 B1
(45) Date of Patent: Jun. 9, 2020

(54) PERIPHERAL BASED MEMORY SAFETY SCHEME FOR MULTI-CORE PLATFORMS

(71) Applicant: NXP B.V., Eindhoven (NL)

(72) Inventors: Marcel Medwed, Graz (AT); Jan Hoogerbrugge, Helmond (NL); Ventzislav Nikov, Haasrode (BE)

(73) Assignee: NXP B.V., Eindhoven (NL)

( * ) Notice: Subject to any disclaimer, the term of this patent is extended or adjusted under 35 U.S.C. 154(b) by 15 days.

(21) Appl. No.: 16/206,066

(22) Filed: Nov. 30, 2018

(51) Int. Cl.
*G06F 12/00* (2006.01)
*G06F 3/06* (2006.01)
*G06F 13/24* (2006.01)

(52) U.S. Cl.
CPC .......... *G06F 3/0655* (2013.01); *G06F 3/0604* (2013.01); *G06F 3/0673* (2013.01); *G06F 13/24* (2013.01)

(58) Field of Classification Search
CPC .... G06F 3/0655; G06F 3/0604; G06F 3/0673; G06F 13/24
See application file for complete search history.

(56) References Cited

U.S. PATENT DOCUMENTS

| 7,086,088 | B2 | 8/2006 | Narayanan |
| 7,802,232 | B2 | 9/2010 | Zorn et al. |
| 7,810,080 | B2 | 10/2010 | Plum et al. |
| 9,892,253 | B1 | 2/2018 | Mehr |
| 2003/0014667 | A1 | 1/2003 | Kolichtchak |
| 2003/0172293 | A1 | 9/2003 | Johnson et al. |
| 2016/0147466 | A1 | 5/2016 | Yazdani et al. |

FOREIGN PATENT DOCUMENTS

| CN | 101833631 B | 4/2011 |
| CN | 104809391 B | 8/2018 |

OTHER PUBLICATIONS

Duck et al., Stack Bounds Protection with Low Fat Pointers, Mar. 2017, NDSS '17, pp. 1-15.*
A. Kwon et al., Low-fat Pointers: Compact Encoding and Efficient Gate-level Implementation of Fat Pointers for Spatial Safety and Capability-based Security, CCS'13, Nov. 2013.
G. J. Duck et al. "Heap Bounds Protection with Low Fat Pointers," in Proceedings of the 25th International Conference on Compiler Construction, Barcelona, Spain, CC'16, Mar. 2016.

* cited by examiner

*Primary Examiner* — Shawn X Gu

(57) ABSTRACT

A computing system using low-fat pointers, including: a memory configured to be accessed by the low-fat pointers; a processing core configured to access the memory; an interrupt controller configured to receive interrupts and to communicate interrupts to processes running on the processing core; and a memory safety peripheral configured to receive a pointer request, wherein the pointer is a low-fat pointer and to verify that the pointer request is within required memory bounds.

17 Claims, 3 Drawing Sheets

PERIPHERAL BASED MEMORY SAFETY SCHEME FOR MULTI-CORE PLATFORMS

TECHNICAL FIELD

Various exemplary embodiments disclosed herein relate generally to a peripheral based memory safety scheme for multi-core platforms.

BACKGROUND

Memory safety is the most effective countermeasure against attacks which are based on memory vulnerabilities (buffer overflows, return-oriented programming (ROP) attacks, etc.) Whereas most modern languages like Java are memory safe, for C and C++, these mechanisms must be retrofitted. The most prominent approach is the use of so-called fat pointers. Fat pointers come with a lower and upper bound of the referenced data structure as meta data, thus tripling the size of a pointer. As the overhead associated with handling fat pointers is usually prohibitive for the use of the countermeasure, low-fat pointers were developed (see G. J. Duck and R. H. C. Yap, "Heap Bounds Protection with Low Fat Pointers," in *Proceedings of the 25th International Conference on Compiler Construction*, Barcelona, Spain, 2016.)

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a computing system using low-fat pointers, including: a memory configured to be accessed by the low-fat pointers; a processing core configured to access the memory; an interrupt controller configured to receive interrupts and to communicate interrupts to processes running on the processing core; and a memory safety peripheral configured to receive a pointer request, wherein the pointer is a low-fat pointer and to verify that the pointer request is within required memory bounds.

Various embodiments are described, wherein the low-fat pointer encodes the size of an object referred to by the low-fat pointer.

Various embodiments are described, wherein memory includes a plurality of memory segments wherein each segment only stores objects of a specified size and wherein the memory segments are aligned based upon the specified size.

Various embodiments are described, wherein the low-fat pointer encodes the size and the upper bound or the lower and upper bounds of an object referred to by the low-fat pointer in a floating point format.

Various embodiments are described, wherein the pointer request includes an original pointer and an updated pointer and wherein verifying the pointer request includes verifying that the updated pointer is within the required memory bounds.

Various embodiments are described, wherein the pointer request includes an original pointer and an offset and wherein verifying the pointer request includes verifying that the original pointer plus the offset is within the required memory bounds.

Various embodiments are described, wherein the interrupt controller receives a memory bounds interrupt when the memory safety peripheral verifies that the pointer request is outside the required memory bounds.

Various embodiments are described, wherein the memory safety peripheral stores an indication of a physical address via which the pointer request was submitted and an interrupt service routine performs the translation between the physical address indication and the process identifier of the process associated with the pointer request that is outside the required memory bounds.

Various embodiments are described, wherein interrupt controller forwards the memory bounds interrupt to a device driver in the core, wherein the device driver identifies queries the memory safety peripheral to determine the process associated with the memory bounds interrupt.

Various embodiments are described, further including a compiler that is configured to compile code so that pointers are converted to low-fat pointers and are sent to the memory safety peripheral.

Further various embodiments relate to a method of using low-fat pointers to access memory, including: generating, by a process running in a processing core, a pointer request using a low-fat pointer to an object in a memory; verifying, by a memory safety peripheral, that the pointer request is within required memory bounds; and receiving, by an interrupt controller, interrupts when pointer request is not within the required memory bounds.

Various embodiments are described, wherein the low-fat pointer encodes the size of the object referred to by the low-fat pointer.

Various embodiments are described, wherein memory includes a plurality of memory segments wherein each segment only stores objects of a specified size and wherein the memory segments are aligned based upon the specified size.

Various embodiments are described, wherein the low-fat pointer encodes the upper bound of the object referred to by the low-fat pointer in a floating point format.

Various embodiments are described, wherein the pointer request includes an original pointer and an updated pointer and wherein verifying the pointer request includes verifying that the updated point is within the required memory bounds.

Various embodiments are described, wherein the pointer request includes an original pointer and an offset and wherein verifying the pointer request includes verifying that the original pointer plus the offset is within the required memory bounds.

Various embodiments are described, further comprising storing, by the memory safety peripheral, a process identifier of the process associated with the pointer request that is outside the required memory bounds.

Various embodiments are described, further including: storing, by the memory safety peripheral, an indication of a physical address via which the pointer request was submitted; and performing, by an interrupt service routine, the translation between the physical address indication and the process identifier of the process associated with the pointer request that is outside the required memory bounds.

Various embodiments are described, wherein forwarding, by the interrupt controller, the memory bounds interrupt to a device driver in the core, wherein the device driver identifies queries the memory safety peripheral to determine the process accesses the memory protection peripheral to determine the process identifier associated with the memory bounds interrupt.

Various embodiments are described, further including compiling, by a compiler, code so that pointers are converted to low-fat pointers and are sent to the memory safety peripheral.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
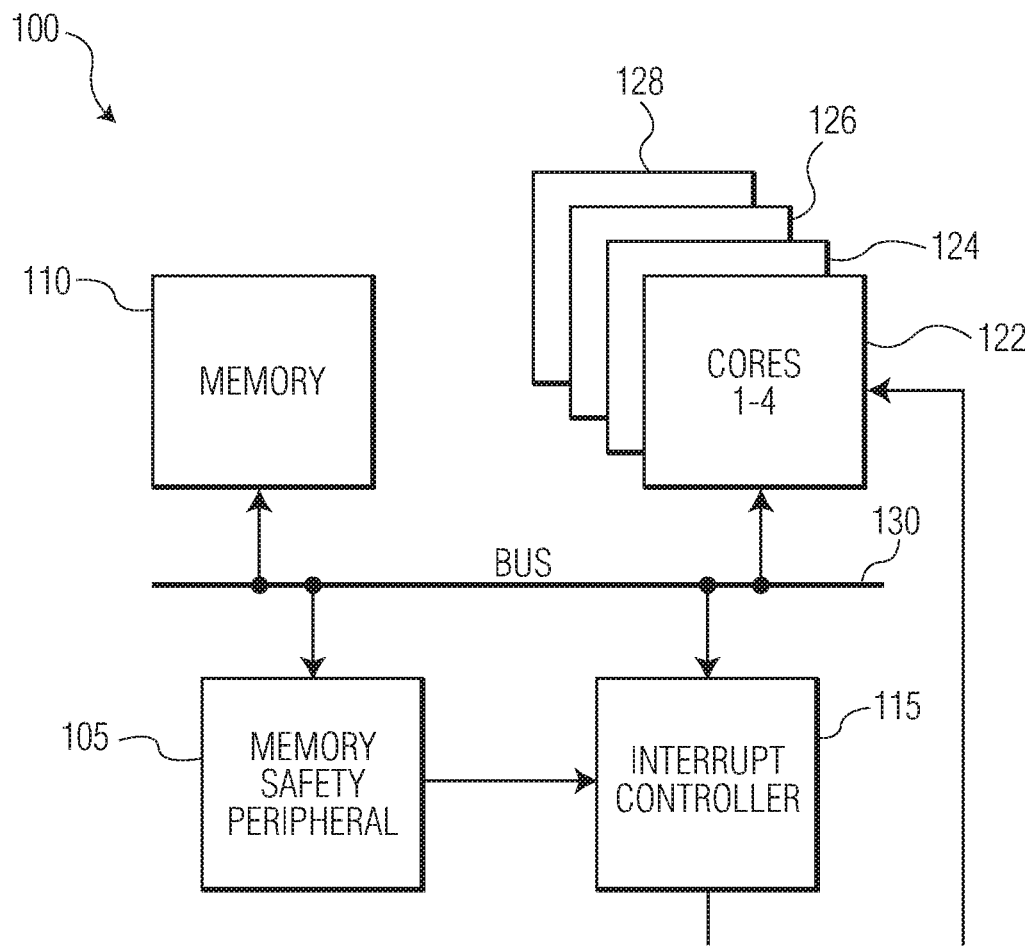
FIG. 1 illustrates a computing system using a memory safety peripheral.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Memory safety is the most effective countermeasure against attacks which are based on memory vulnerabilities (buffer overflows, return-oriented programming (ROP) attacks, etc.). Whereas most modern languages like Java are memory safe, for C and C++, these mechanisms must be retrofitted. The most prominent approach is the use of so-called fat pointers. Fat pointers come with a lower and upper bound of the referenced data structure as meta data, thus tripling the size of a pointer. For fat pointers, the verification may be done transparently inside the CPU without any overhead, but the overhead that comes from handling fat pointers in memory is usually prohibiting for the use of the countermeasure. Essentially, because the amount of data that must be moved is not only tripled, but also needs to be stored in shadow memory. To overcome this problem and to avoid the need for CPU modifications, low-fat pointers were developed. Low-fat pointers have no overhead for handling the pointers in memory, but on the other hand are more complicated to verify than fat pointers. Especially in software, verifying low-fat pointers may induce significant overheads. It is also possible to implement low-fat pointers inside the CPU pipeline using tailored instructions for pointer arithmetic, but this approach then becomes practically unusable for off-the-shelf licensed cores like for instance the ARM Cortex-A application processors.

Embodiments are described herein using low-fat pointers which do not need CPU modifications and may be used in a multi-process environment. The embodiment includes a memory safety peripheral which allows the check of a tuple including a valid pointer including some meta data and a therefrom derived pointer or a corresponding offset for consistency. It is also noted that the memory safety peripheral is flexible with respect to the coding scheme, and using the low-fat pointers described by Duck et al. is just one way of implementing the memory safety peripheral. Finally, the memory safety peripheral uses techniques for increasing the pointer data throughput from the CPU to the peripheral as well as for compressing the pointer data itself.

FIG. 1 illustrates a computing system using a memory safety peripheral. The system 100 includes four computing cores 122, 124, 126, and 128, memory 110, a memory safety peripheral 105, an interrupt controller 115, and bus 130. The cores 122-128 carry out various computing tasks and communicates with the memory 110 via the bus 130 for various storage needs. While four cores are shown, more or less cores may be present in the system.

The memory safety peripheral 105 may also be connected to bus 130 in the system 100. Furthermore, memory safety peripheral 105 may connected to the interrupt controller 115 via the bus 130.

A compiler (together with a runtime library/allocator), may be associated with the system 100, that translates code in such a way that pointers include compressed meta data encoded therein. In addition, the compiler determines whenever pointer data needs to be sent to the memory safety peripheral 105 for checking. In a very basic case, every pointer modification may be checked, but optimizations are possible and essential to improve performance.

The cores may include a device driver that maps part of the memory safety peripheral's address space into the address space of a process. The device driver keeps track of the mapping between a process and the physical address space within the assigned peripheral address space.

The interrupt controller 115 may have access to the mapping between a process and its physical address space within the memory safety peripheral's address space. When an interrupt needs to be serviced, the interrupt controller 115 may determine the physical address to which the invalid pointer pair was written and therefore signal an operating system (OS) in the cores 122-128 to indicate which process caused the violation.

Figure 2:
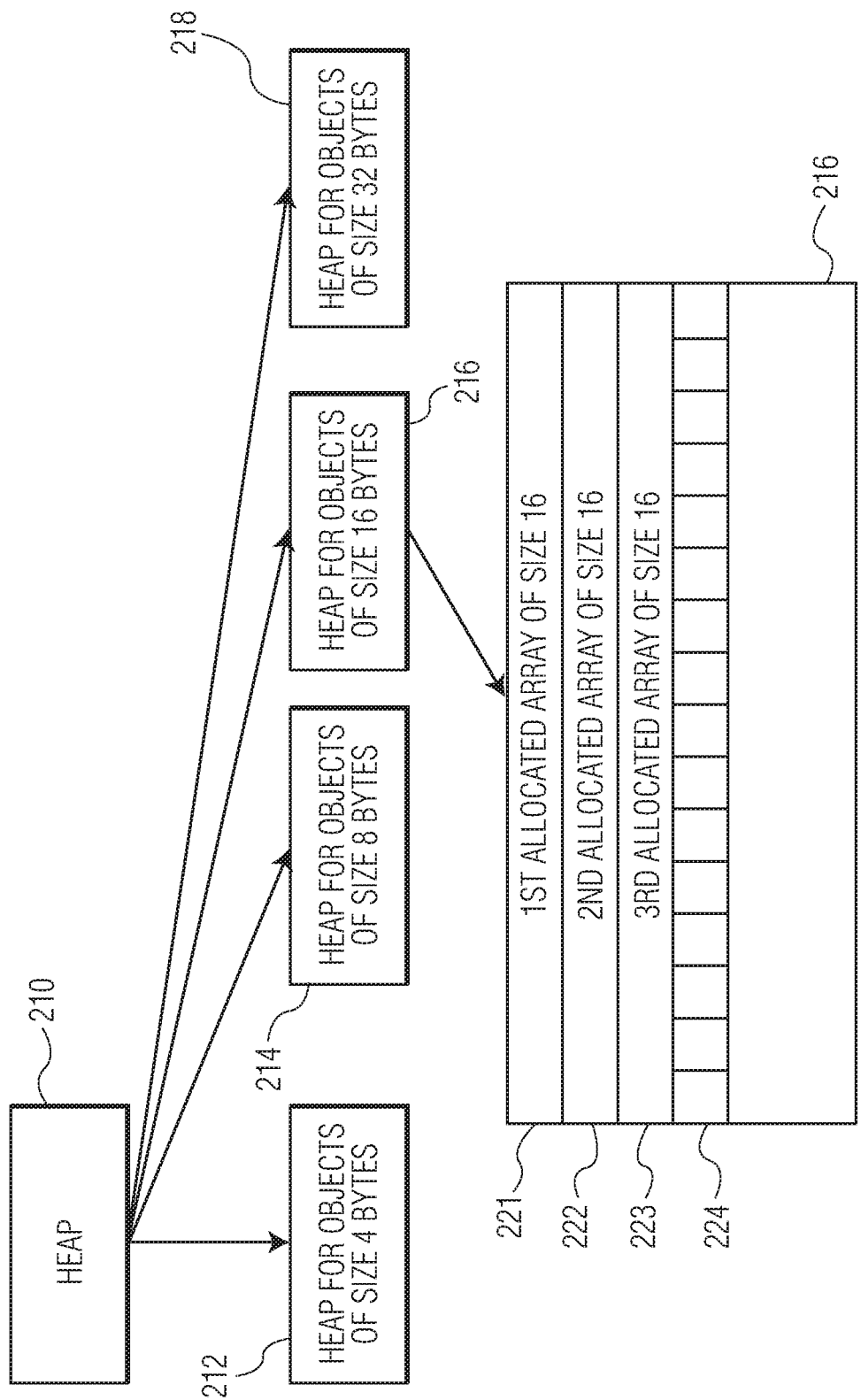
FIG. 2 illustrates an embodiment of a low-fat pointer coding scheme.

The coding scheme of Duck et al. will now be described because understanding its operation is helpful in describing the system 100. FIG. 2 illustrates an embodiment of a low-fat pointer coding scheme according to Duck et. al. The focus will be on the heap 210, noting that the low-fat point scheme may also be applied in a similar way on the stack. It may be seen that the heap 210 is not allocated in one memory segment but in one segment per object size. For example, memory segment 212 is for 4 byte objects; memory segment 214 is for 8 byte objects; memory segment 216 is for 16 byte objects; and memory segment 218 is for 32 byte objects. The object size is encoded in the virtual address. In this example, the size is encoded as log 2(size) in the bits 32 to 37. Six bits are sufficient in this case. However, if a finer granularity is desired, a different coding than just using powers of two may be used. Encoding the size in the virtual address has two major advantages. First, the overall number of bits used for encoding the address and the meta data is the same as for only encoding the address in the unprotected representation. Second, the new pointers are perfectly valid, even for linked shared libraries which are memory safety scheme agnostic. The heap selection is performed by the modified allocator (e.g., lowfatmalloc( )). However, a pointer which only has its target object size encoded does not allow for a validation. Therefore, all objects may be aligned to a boundary which may be equal to the object's size. Finally, a check itself takes place on a pointer and an updated pointer. Therefore, not only is the memory access using the pointer protected, but the modification of a pointer is protected. This of course implies that the original pointer must be valid in the first place.

An example of performing a check is illustrated for memory segment 216 that stores 16 byte objects. The memory segment 216 may for example span addresses 0x400000000 to 0x4FFFFFFFF. The memory segment 216 shows three allocated objects that are 16 byte arrays 221, 222, and 223. Then when a fourth 16 byte object 224 is allocated using the malloc(16) command, the address 0x400000030 is returned. Then an updated pointer for the fourth object 224 is received with a value of 0x400000038. This update will now trigger a check that includes the following steps:
1) Pointer update that triggers check: p'=p+17. Note this will be outside the allowed boundaries.
2) Get the size of the object associated with pointer p: $2^{(p>>32)}$=16-16 bytes.
3) Get the lower bound: (p-p %16)→0x400000030.
4) Check the pointer p': 0x400000030<=p'< (0x400000030+16)→fail→raise exception.

In this case the pointer update fell outside the allowed range for the object, and hence the check failed, and an exception is raised.

Figure 3:
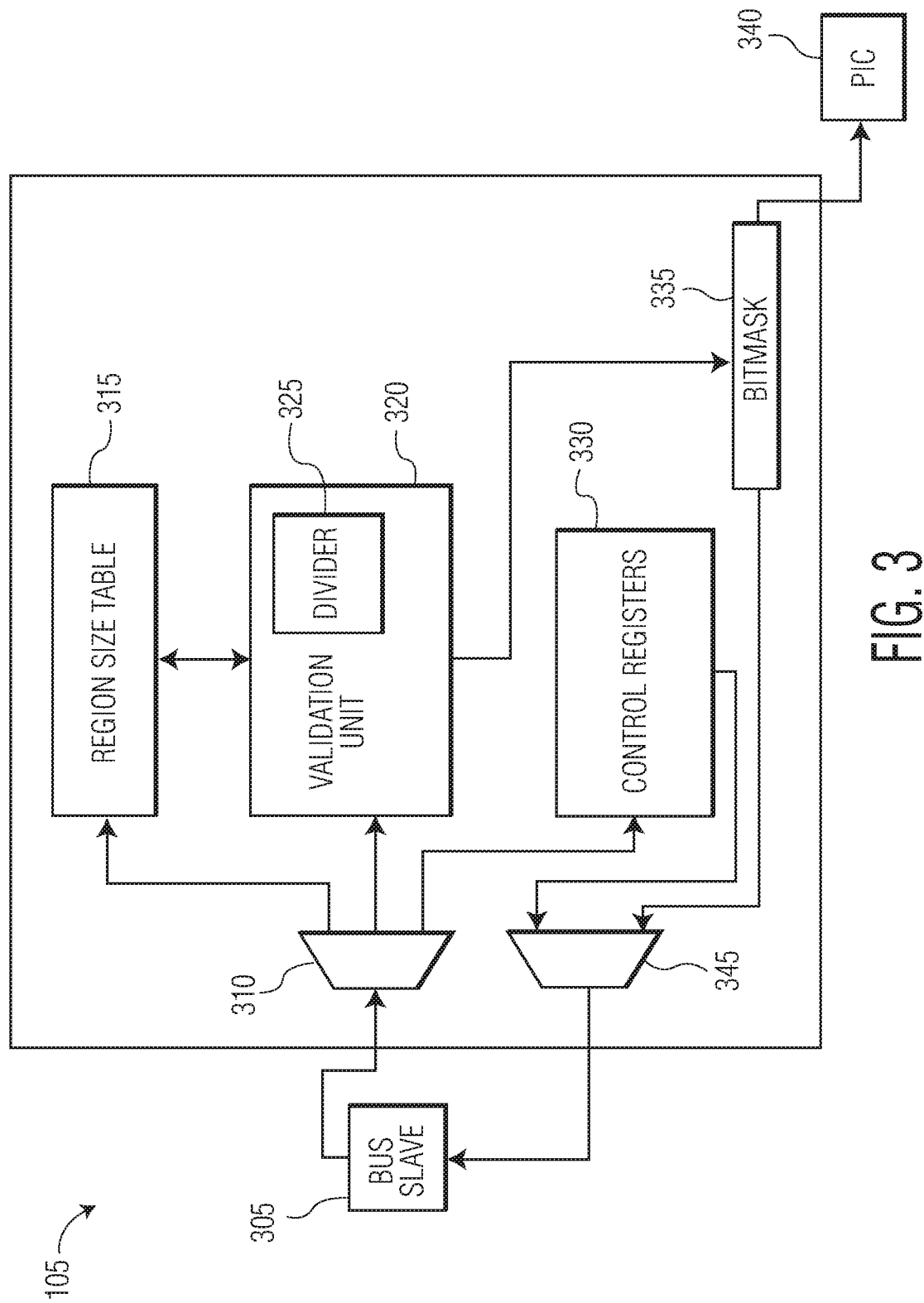
FIG. 3 illustrates a block diagram of the memory safety peripheral.

FIG. 3 illustrates a block diagram of the memory safety peripheral. The memory safety peripheral 105 includes a bus slave 305, multiplexer 310, regions size table 315, validation unit 320, divider 325, control registers 330, bitmask 335, PIC 340, and multiplexer 345. The bus slave 305 receives pointer verification requests related to memory accesses by the cores. The multiplexer 310 forwards signals from the bus to the region size table 315, the validation unit 320, and the control registers 330. It is noted, that the multiplexer 310 may be omitted and the region size table 315, the validation unit 320, and the control registers 330 would communicate directly with the bus. The multiplexer 345 receives signals from the control registers 330 and the bit mask 335 and arbitrates between them when they write to the bus to ensure that only on of the control registers 330 and the bit mask 335 are writing to the bus at one time.

The region size table 315 allows the user to configure the region size for the various tag values. In the example above, the region size is encoded as a power of 2, so 4 means 16 bytes, but in practice intermediate steps may also be defined, so for instance 5 could then be mapped to 24 bytes. For this we need the lookup table. The validation unit 320 requests the region size which corresponds to the most significant address bits and does the calculation, as described in the example above, using the divider 325 which is needed for the modulo operation. The validation unit 320 also stores the physical address at which a pointer validation request came in. This physical address is then mapped to a bit in the bitmask 335 and when a memory violation occurs, this bit is set. For example, bit 0 may correspond to the first 4 k window, bit 1 to the second and so on. If one or more bits are set in the bitmask 335, the signal to the programmable interrupt controller (PIC) 340 becomes high and the interrupt service routine which is associated with the memory safety peripheral is called at the next convenient moment. The service routine itself is part of the driver. Therefore, the service routine may access the mapping between the processes and the physical address window. The interrupt service routine requests the bitmask 335 and then translates the bitmask to one or more processes that caused the violation. These processes are communicated to the OS. Afterwards the bitmask 335 may be cleared or partially cleared via the control registers 330

The embodiments described herein may use the coding scheme of Duck et al., but other coding schemes may be used as well. What is important for the following description is that such pointer encodings either require a pointer pair or a pointer and an offset as input for the validation.

In a first embodiment of the scheme, a pointer pair, namely the original pointer and the updated pointer will be sent to the memory safety peripheral 105. As the memory safety peripheral 105 is located on a fixed virtual address within every process' address space, the compiler just inserts such checks as store operations where the data arguments are the original and the new pointer and the destination address is the memory safety peripheral 105.

In order to speed up the transfer from the cores 122-128 to the memory safety peripheral 105, the memory management unit (MMU) (not shown but part of the cores 122-128) will be configured for a memory device in write-through mode. By doing so, throughput increases, but also some pointer pairs are simply discarded as some memory transfers are combined. To mitigate this shortcoming, a larger memory space for the memory safety peripheral 105 is allocated, and the pointer is incremented after every write. This may be done, for example, on ARM cores with the STP X0, X1, [X2, #16]! instruction. This instruction writes both pointers in X0 and X1 in one instruction and "auto-increments" the address in X2. Now in order to avoid the address running out of the memory safety peripheral's address space, the address has to be masked in regular intervals. That is, if a process owns a 4 kB page of the peripheral, X2 may be checked whether it is in the lower or upper 2 kB and in the latter case, 2 kB can be subtracted from X2. This can be for instance done by a BIC X2, #0x1000 instruction (again using the ARM instruction set as an example). In the worst case, this has to be done after every access, but more efficient intervals may be determined by the compiler.

In another embodiment, a pointer and an offset may be sent to the memory safety peripheral 105. This may be advantageous if the updated pointer of the pointer pair to be transferred is not available. This is usually the case for accesses to fields of a structure or an object where a load or store could simply be done using a base address and an immediate offset. This typically saves the costs of computing the updated pointer and especially the register for storing it. This may be further improved by encoding the offset within the least significant bits of the address within the memory safety peripheral's address space. That is, by for instance storing the original pointer to a special address range within the memory safety peripheral 105 with an offset of 16, the memory safety peripheral may understand, that the pointer pair (pointer, pointer+16) should be validated. In addition to the advantages mentioned before, this strategy also saves the second memory transfer.

Even though, the memory safety peripheral 105 may be used as such for serving a single process, in modern computer systems, such a memory safety peripheral 105 would have little value. The idea to allow the memory safety peripheral 105 to serve several processes at once is to encode the process ID into the data transfers via the physical address. Assume that the peripheral should be able to serve 256 processes at once. Further, the address space of the memory safety peripheral 105, which is seen by the process, is a 4 kB page. Then the physical memory space reserved for the peripheral would be 0x100000 bytes. The memory safety peripheral 105 includes a driver that holds a map of (process ID, physical address) pairs. Now, every time a process wants to open the memory safety peripheral 105, the driver checks, which of these 256 pages has not been taken yet and maps it to a fixed virtual address in the process' address space that is either known by the compiler in advance or inserted by a modified loader. When a process now writes to the memory safety peripheral 105, its process ID is encoded in the physical address.

The interrupt controller 115 is registered with the driver and thus has access to the same (process ID, physical address) pairs table. Upon serving an interrupt by the device, the interrupt controller 115 may probe the memory safety peripheral 105 for the physical address that triggered the error. A small buffer is sufficient to store the possibly several physical addresses. Note that only a few bits of the physical address are sufficient to index the table. In the above example 8 bits would be sufficient. Alternatively, a 256-bit array inside the peripheral may also be used to store which process caused the violation. A table lookup inside the driver then yields the process ID which can be communicated to the OS.

The encoding used by the low-fat pointer may be of various types, each of them having advantages and disadvantages. Therefore, a combination of various types is conceivable and in certain situations may provide benefits. The Duck encoding includes aligning a data type to a boundary determined by its size and encoding the size into the pointer. Yet another encoding could include encoding the upper bound of the pointer in floating point format (see A. Kwon, U. Dhawan, J. M. Smith, J. T. F. Knight and A. DeHon, "Low-fat Pointers: Compact Encoding and Efficient Gate-level Implementation of Fat Pointers for Spatial Safety and Capability-based Security," in *Proceedings of the* 2013 *ACM SIGSAC Conference on Computer & Communications Security*, New York, N.Y., USA, 2013). Supporting two or more encodings may be achieved either by reserving two different address spaces in the memory safety peripheral 105 for the different encodings or by encoding the address space into the pointer itself. Encoding the address space into the pointer has the advantage that the code does not need to be aware of it when it sends the pointer pair to the memory safety peripheral 105.

The embodiments described herein provide a technological advantage of handling the verification of low-fat pointers in a memory safety peripheral. The fact that the process information is encoded in the physical address at which the memory safety peripheral is accessed, allows omitting the storage of this information in hardware and to rather store it via the driver in DRAM. This therefore allows for checking low-fat pointer efficiently without modifying the CPU and still being scalable when it comes to the number of processes that can be supported.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A computing system using low-fat pointers, comprising:
   a memory configured to be accessed by the low-fat pointers;
   a processing core configured to access the memory;
   an interrupt controller configured to receive interrupts and to communicate interrupts to processes running on the processing core, wherein the interrupt controller receives a memory bounds interrupt when a memory safety peripheral verifies that a pointer request is outside the required memory bounds; and
   the memory safety peripheral configured to receive the pointer request, wherein the pointer is a low-fat pointer and to verify that the pointer request is within required memory bounds, wherein the memory safety peripheral stores an indication of a physical address via which the pointer request was submitted and an interrupt service routine performs a translation between the physical address indication and a process identifier of a process associated with the pointer request that is outside the required memory bounds.

2. The computing system of claim 1, wherein the received low-fat pointer encodes a size of an object referred to by the received low-fat pointer.

3. The computing system of claim 2, wherein the memory includes a plurality of memory segments wherein each segment only stores objects of a specified size and wherein the memory segments are aligned based upon specified sizes.

4. The computing system of claim 1, wherein the received low-fat pointer encodes a size and an upper bound or the lower and upper bounds of an object referred to by the received low-fat pointer in a floating point format.

5. The computing system of claim 1, wherein the pointer request includes an original pointer and an updated pointer and wherein verifying the pointer request includes verifying that the updated pointer is within the required memory bounds.

6. The computing system of claim 1, wherein the pointer request includes an original pointer and an offset and wherein verifying the pointer request includes verifying that the original pointer plus the offset is within the required memory bounds.

7. The computing system of claim 1, wherein the interrupt controller forwards the memory bounds interrupt to a device driver in a core, wherein the device driver identifies queries to the memory safety peripheral to determine a process associated with the memory bounds interrupt.

8. The computing system of claim 1, further comprising a compiler that is configured to compile code so that pointers are converted to low-fat pointers and are sent to the memory safety peripheral.

9. A method of using low-fat pointers to access memory, comprising:
   generating, by a process running in a processing core, a pointer request using a low-fat pointer to an object in a memory;
   verifying, by a memory safety peripheral, that the pointer request is within required memory bounds;
   storing, by the memory safety peripheral, a process identifier of the process associated with the pointer request that is outside the required memory bounds; and
   receiving, by an interrupt controller, interrupts when the pointer request is not within the required memory bounds.

10. The method of claim 9, wherein the low-fat pointer encodes a size of the object referred to by the low-fat pointer.

11. The method of claim 10, wherein the memory includes a plurality of memory segments wherein each segment only stores objects of a specified size and wherein the memory segments are aligned based upon specified sizes.

12. The method of claim 9, wherein the low-fat pointer encodes an upper bound of the object referred to by the low-fat pointer in a floating point format.

13. The method of claim 9, wherein the pointer request includes an original pointer and an updated pointer and wherein verifying the pointer request includes verifying that the updated pointer is within the required memory bounds.

14. The method of claim 9, wherein the pointer request includes an original pointer and an offset and wherein verifying the pointer request includes verifying that the original pointer plus the offset is within the required memory bounds.

15. The method of claim 9, further comprising:
   storing, by the memory safety peripheral, an indication of a physical address via which the pointer request was submitted; and
   performing, by an interrupt service routine, a translation between the physical address indication and the process identifier of the process associated with the pointer request that is outside the required memory bounds.

16. The method of claim 15, wherein forwarding, by the interrupt controller, a memory bounds interrupt to a device driver in the processing core, wherein the device driver identifies queries to the memory safety peripheral to determine the process accesses the memory safety peripheral to determine the process identifier associated with the memory bounds interrupt.

17. The method of claim 9, further comprising compiling, by a compiler, code so that pointers are converted to low-fat pointers and are sent to the memory safety peripheral.

* * * * *